United States Patent [19]

Matsubayashi et al.

[11] Patent Number: 5,124,868
[45] Date of Patent: Jun. 23, 1992

[54] MAGNETO-OPTIC PLAYER WITH IMPROVED C/N RATIO

[75] Inventors: Nobuhide Matsubayashi; Osamu Nakano, both of Hachioji, Japan

[73] Assignee: Olympus Optical Co., Ltd., Tokyo, Japan

[21] Appl. No.: 467,528

[22] Filed: Jan. 19, 1990

[30] Foreign Application Priority Data

Jan. 25, 1989 [JP] Japan .................................. 1-14003
Aug. 11, 1989 [JP] Japan ................................ 1-206934

[51] Int. Cl.$^5$ ...................... G11B 5/127; G11B 11/12; G11B 13/04
[52] U.S. Cl. .................................. 360/114; 369/110; 369/13
[58] Field of Search .................. 369/110, 13; 360/114, 360/59

[56] References Cited

U.S. PATENT DOCUMENTS

| | | | |
|---|---|---|---|
| 4,691,308 | 9/1987 | Takagi et al. | 369/13 |
| 4,841,510 | 6/1989 | Yoshizawa | 369/110 |
| 4,953,124 | 8/1990 | Koyama | 360/114 |
| 4,955,006 | 9/1990 | Fukushima et al. | 369/13 X |

FOREIGN PATENT DOCUMENTS

| | | | |
|---|---|---|---|
| 279183 | 8/1988 | European Pat. Off. | |
| 57-71537 | 5/1982 | Japan | 369/110 |
| 5771538 | 5/1982 | Japan | 369/110 |
| 59-157856 | 9/1984 | Japan | |
| 60-35352 | 2/1985 | Japan | |
| 60-93650 | 5/1985 | Japan | 369/110 |
| 61-24038 | 2/1986 | Japan | 369/110 |
| 61-63935 | 4/1986 | Japan | 369/110 |
| 63-184936 | 7/1988 | Japan | |
| 63-205836 | 8/1988 | Japan | |
| 63-222332 | 9/1988 | Japan | 369/110 |
| 63-269325 | 11/1988 | Japan | 369/110 |
| 0188943 | 4/1989 | Japan | 369/110 |
| 1173328 | 7/1989 | Japan | 369/110 |

OTHER PUBLICATIONS

P. Wolniansky, et al., "Magneto-optical Measurements of Hysteresi Loop and Anisotropy Energy Constants on Amorphous $Tb_xFe_{1-X}$ alloys", J. Applied Physics, Jul. 1, 1986, pp. 346–351.

T. D. Milster, "Characteristics of Phase-Compensation Techniques in Magnetooptical Read-Back Systems", SPIE vol. 1166, Polarization Considerations for Optical Systems II, 1989, pp. 355–365.

Primary Examiner—Aristotelis Psitos
Assistant Examiner—Alfonso Garcia
Attorney, Agent, or Firm—Stevens, Davis, Miller & Mosher

[57] ABSTRACT

A magneto-optic player for reading an information signal stored in a magneto-optical record medium in the form of vertical magnetization including a semiconductor laser emitting a linearly polarized laser light beam, a beam splitter for transmitting the laser light beam, an objective lens for projecting the laser light beam transmitted through the beam splitter onto the record medium and for directing light reflected by the record medium, the light being subjected to Kerr rotation the rotational direction of which is dependent upon the direction of the vertical magnetization. A first quarter-wavelength plate arranged between the objective lens and the beam splitter for converting the linearly polarized light reflected by the record medium into an elliptically polarized light the rotational direction of which is determined by the direction of the vertical magnetization. A second quarter-wavelength plate arranged to receive the elliptically polarized light reflected by the beam splitter for converting it into elliptically polarized light the direction of the major axis of which is aligned with P-polarization or S-Polarization depending upon the rotational direction, a polarization beam splitter for splitting the elliptically polarized light into P-polarized and S-polarized components, two photodetectors for receiving the P-polarized and S-polarized components, respectively, and a differential amplifier for deriving a difference between outputs of the two photodetectors as a reproduced information signal.

11 Claims, 6 Drawing Sheets

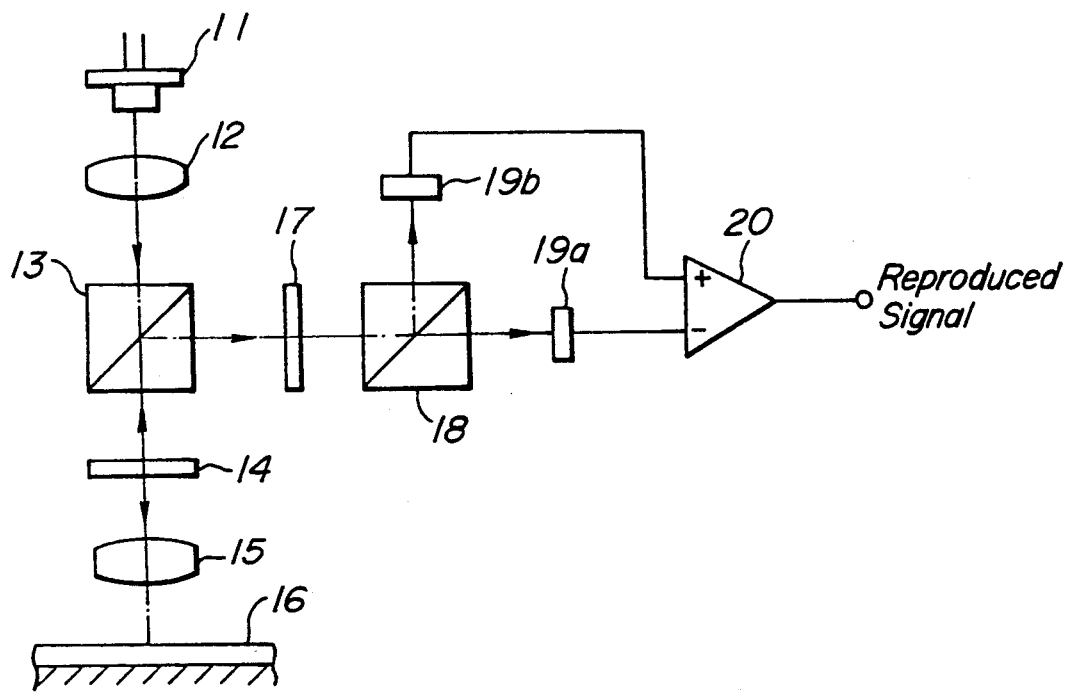
FIG_3

FIG._7A  ⟶  $\begin{pmatrix}1\\0\end{pmatrix}$

FIG._7B  ⟷  $\sqrt{T_P}\begin{pmatrix}1\\0\end{pmatrix}$

FIG._7C  $\sqrt{RT_P}\begin{pmatrix}\cos\theta_k\\\pm\sin\theta_k\end{pmatrix}$ FIG._7D  $\sqrt{RT_P}\begin{pmatrix}\sqrt{R_P}\cos\theta_k\\\pm i\sqrt{R_S}\sin\theta_k\end{pmatrix}$ FIG._7E  $\dfrac{\sqrt{RT_P}}{2}\begin{pmatrix}\sqrt{R_P}\cos\theta_k\mp\sqrt{R_S}\sin\theta_k\\i(\sqrt{R_P}\cos\theta_k\pm\sqrt{R_S}\sin\theta_k)\end{pmatrix}$ FIG._7F  $\dfrac{\sqrt{RT_P}}{2}\begin{pmatrix}\sqrt{R_P}\cos\theta_k\mp\sqrt{R_S}\sin\theta_k\\0\end{pmatrix}$ FIG._7G 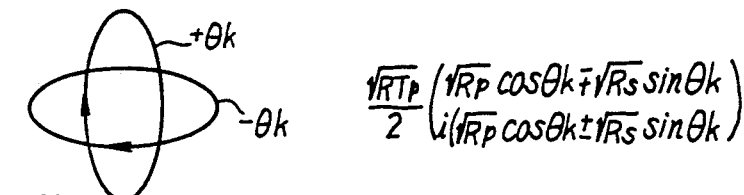 $\dfrac{\sqrt{RT_P}}{2}\begin{pmatrix}0\\\sqrt{R_P}\cos\theta_k\pm\sqrt{R_S}\sin\theta_k\end{pmatrix}$

MAGNETO-OPTIC PLAYER WITH IMPROVED C/N RATIO

BACKGROUND OF THE INVENTION

Field of the Invention and Related Art Statement

The present invention relates to a magneto-optic player for reading an information signal out of a magneto-optic record medium.

There have been proposed various kinds of magneto-optic players. Some examples are disclosed in Japanese Patent Publications Kokai-sho 63-184936 and 63-205836, and U.S. Pat. Nos. 3,284,785, 3,525,870 and 4,774,615.

FIG. 1 shows the construction of a known magneto-optic player. In this known magneto-optic player, laser light emitted from a semiconductor laser 1 is projected upon a magneto-optic player 5 by means of a collimator lens 2, a beam splitter 3 and an objective lens 4. Light reflected by the magneto-optic record medium 5 is made incident upon a polarization beam splitter 7 by means of the objective lens 4, the beam splitter 3 and a halfwave plate 6. Light beams transmitted through and reflected by the polarization beam splitter 7 are received by photodetectors 8a and 8b, respectively. Output signals from the photodetectors 8a and 8b are supplied to a differential amplifier 9 to derive a reproduced signal. In this manner, it is possible to derive a reproduced information signal in the differential manner. In this known magneto-optic player, the halfwave plate 6 is arranged such that an orientation of an optical axis of a crystal of the plate is set to 22.5 degrees with respect to the polarization direction of the linearly polarized incident laser light impinging upon the magneto-optic record medium 5, so that the polarization plane of the laser light impinging upon the polarization beam splitter 7 is rotated by 45 degrees with respect to the incident laser light.

FIG. 2A to 2G illustrate the polarized conditions and Jones vectors of polarized light beams traveling along various light paths in the known magneto-optic player shown in FIG. 1. It is assumed that the linearly polarized laser light emitted by the semiconductor laser 1 has a unit amplitude of 1 as shown in FIG. 2A. This laser light is transmitted through the beam splitter 3 as the linearly polarized light as illustrated in FIG. 2B. The amplitude of the transmitted laser light can be represented by $\sqrt{T_P}$, wherein $T_P$ is the transmissivity of the beam splitter 3. The laser light reflected by the magneto-optic record medium 5 is shown in FIG. 2C, wherein R represents the reflectance of the record medium 5 and $\pm \theta_K$ denote the Kerr rotation angles, the positive and negative signs being determined in accordance with the direction of the vertical magnetization in the record medium. That is to say, when the information signal is recorded in one direction of the vertical magnetization, the polarization plane of the incident linearly polarized light is rotated by $+\theta_K$, while when the signal is recorded in the opposite direction of magnetization, the incident light is subjected to the Kerr rotation of $-\theta_K$. When the laser beam is reflected by the beam splitter 3, the laser light represented in FIG. 2D can be obtained, in which $R_P$ and $R_S$ denote the reflectances of the beam splitter 3 for P-polarized light and S-polarized light, respectively. It should be noted that the reflectance for the S-polarized light is assumed to be 100%. The polarization plane of the light reflected by the beam splitter 3 is rotated by 45 degrees by means of the halfwave plate 6 as shown in FIG. 2E. The light transmitted through the halfwave plate 6 is made incident upon the polarization beam splitter 7 and is separated into the P-polarized light (transmitted light) and S-polarized light (reflected light) as illustrated in FIGS. 2F and 2G. By detecting these light beams with the aid of the two photodetectors 8a and 8b and then deriving the difference between the outputs of the photodetectors, it is possible to reproduce the information signal having a rather high C/N ratio in the differential manner.

However, in the known magneto-optic player shown in FIG. 1, it has been confirmed that the C/N ratio of the reproduced information signal is greatly affected by a deviation of the orientation of the halfwave plate 6, so that the halfwave plate has to be adjusted very precisely. This will be further explained in detail.

As explained above, the halfwave plate 6 should be arranged such that the orientation of the optical axis of the crystal plate is set to 22.5 degrees with respect to the linear polarizing direction of the laser light emitted by the semiconductor laser 1. If the setting angle of the halfwave plate 6 is deviated by an angle of $\alpha$ degrees and the optical axis of the crystal plate is changed to $22.5 + \alpha$, the rotation angle of the polarization plane of the incident light due to the Kerr rotation becomes $45 + 2\alpha$ degrees. Then, the amplitude of the reproduced signal obtained by deriving the difference between the output signals from the photodetectors 8a and 8b can be expressed as follows.

$$RT_P \sqrt{R_P R_S} \sin 2\theta k \cos 4\alpha \tag{1}$$

Further, an amount of differential unbalance of intensity of light beams impinging upon the two photodetectors 8a and 8b can be represented by the following equation.

$$RT_P \sin 4\alpha (R_P \cos^2 \theta_K - R_S \sin^2 \theta_K) \tag{2}$$

As can be understood from the above mentioned two equations (1) and (2), when the halfwave plate 6 has a setting error of $\alpha$, the intensity of the reproduced signal is decreased in proportion to $\cos 4\alpha$ and the differential unbalance amount is increased in proportion to $\sin 4\alpha$. Therefore, even if the deviation angle $\alpha$ is very small, there is produced a large amount of noise and the C/N ratio of the reproduced signal is decreased to a great extent.

As explained above, in the known magneto-optic player shown in FIG. 1, the C/N ratio of the reproduced signal is decreased to a great extent due to the deviation of the orientation of the halfwave plate 6, so that the arrangement of the halfwave plate has to be adjusted very precisely and thus the assembling of the player becomes very cumbersome and the cost of the player is liable to be high.

In order to avoid the above explained drawback, one possibility is to delete the halfwave plate 6 and the polarization beam splitter 7 is rotated by 45 degrees about the optical axis in the drawing of FIG. 1. In such arrangement, the influence of the adjustment error of the optical system is reduced to half of that of the player shown in FIG. 1, and therefore the precision of arrangement can be reduced by a factor of two. However, in such an arrangement, the light reflected by the polarization beam splitter 7 is bent by 45 degrees with respect to the plane of the drawing of FIG. 1, and thus the optical elements could not be arranged in the same plane, so that the overall construction of the optical system becomes large.

SUMMARY OF THE INVENTION

The present invention has for its object to provide a novel and useful magneto-optic player in which the reduction of the C/N ratio due to the adjustment error of the optical system can be mitigated, so that the assembly of the player is fabricated and the cost can be decreased to a great extent.

According to the invention, a magneto-optic player for reading an information signal stored in a magneto-optic record medium in the form of vertical magnetization comprises:

a light source means for projecting a linearly polarized light beam upon the magneto-optic record medium;

a first optical means for converting a linearly polarized light beam reflected by the magneto-optic record medium into one of two elliptically polarized light beams which have the same direction and amplitude, but are polarized in the right-handed and left-handed rotational directions depending upon the direction of the vertical magnetization in the magneto-optic medium;

a second optical means for converting the elliptically polarized light beam emanating from the first optical means into one of two elliptically polarized light beams which are polarized in the same rotational direction, but have orthogonal major axes, depending upon the rotational direction of the incident elliptically polarized light beam;

a third optical means for transmitting a polarized component which is polarized in a direction substantially perpendicular to the major axis of one of the elliptically polarized light beams emanating from the second optical means and reflecting a polarized component which is polarized in a direction substantially perpendicular to the major axis of the other elliptically polarized light beam emanating from the second optical means; and a detecting means for reproducing the information signal by detecting the polarized components transmitted through and reflected by the third optical means in a differential manner.

BRIEF DESCRIPTION OF THE DRAWINGS

FIG. 3 is a schematic view illustrating the construction of a first embodiment of the magneto-optic player according to the present invention;

FIGS. 7A to 7G show vectors for explaining the operation of the third embodiment of the player according to the invention.

DESCRIPTION OF THE PREFERRED EMBODIMENTS

Figure 1:
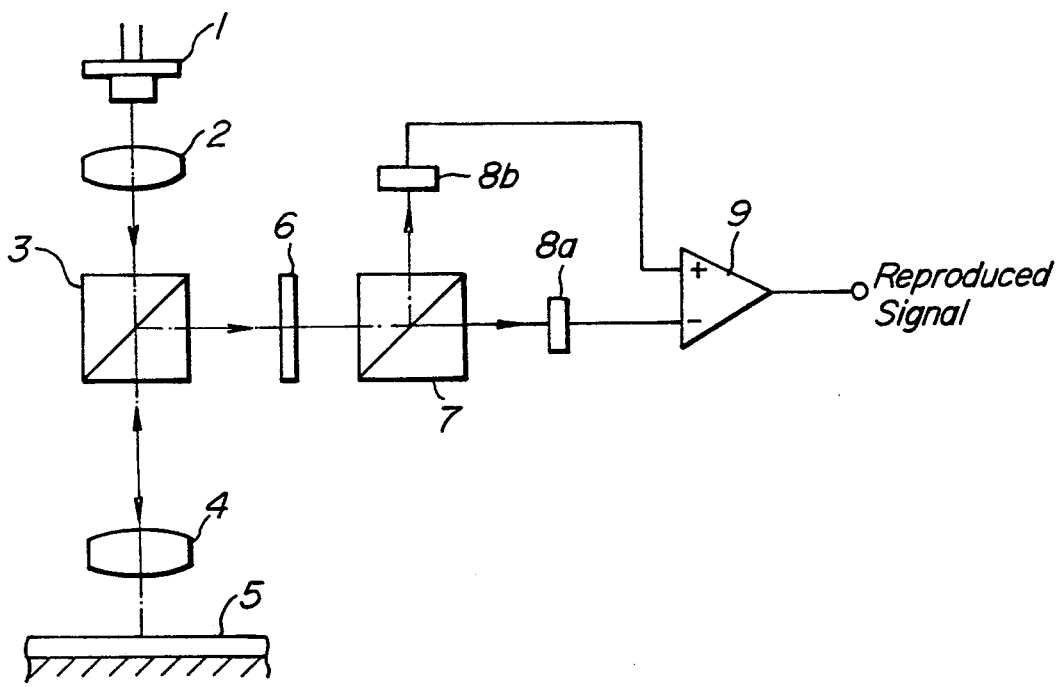
FIG. 1 is a schematic view showing a known magneto-optic player.

FIG. 3 is a schematic view showing a first embodiment of the magneto-optic player according to the invention. In this present embodiment, a linearly polarized laser light beam emitted from a semiconductor laser 11 is made incident upon a magneto-optic record medium 16 by means of a collimator lens 12, a beam splitter 13, a first quarterwave plate 14 and an objective lens 15. An information signal has been recorded in the magneto-optic record medium 16 in the form of vertical magnetization which is perpendicular to the plane of the record medium and whose direction is determined by a bivalent signal. A light beam reflected by the magneto-optic record medium 16 is made incident upon a polarization beam splitter 18 by means of the objective lens 15, the first quarterwave plate 14, the beam splitter 13 and a second quarterwave plate 17. Light beams transmitted through and reflected by the polarization beam splitter 18 are received by photodetectors 19a and 19b, respectively. Output signals generated by these photodetectors 19a and 19b are supplied to a differential amplifier 20 to derive a difference therebetween as a reproduced information signal. It should be noted that the optical axis of a crystal of the first quarterwave player 14 is oriented to be identical with the polarization plane of the linearly polarized light beam impinging upon the magneto-optic record medium 16. That is to say, an angle between the optical axis of the crystal of the first quarterwave plate 14 and the polarization plane of the incident light beam is zero. The second quarterwave plate 17 is arranged such that the optical axis of a crystal of the plate is inclined by 45 degrees with respect to the polarization plane of the linearly polarized incident light beam.

Now the operation of the player according to the present embodiment will be explained with reference to FIGS. 4A to 4I which show the Jones vectors and polarized conditions of light beams on various optical paths.

Figure 4A:
FIGS. 4A to 4I are vectors for explaining the operation of the player depicted in FIG. 3.
Figure 4B:
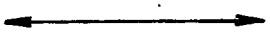
Figure 4C:

As illustrated in FIG. 4A, the incident light beam emitted by the semiconductor laser 11 is linearly polarized and has the unit amplitude of 1. The incident light beam is transmitted through the beam splitter 13 as a linearly polarized beam (P-polarized beam) and has the amplitude of $\sqrt{T_P}$, wherein $T_P$ is the transmissivity of the beam splitter 13. The light beam transmitted through the beam splitter 13 has no S-polarized component, so that the light beam transmitted through the first quarterwave plate 14 retains the same polarized condition as that of the incident light beam as shown in FIG. 4C.

Figure 4D:
Figure 4E:
Figure 4F:
Figure 4G:
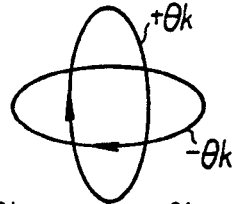
Figure 4H:
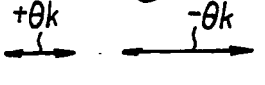
Figure 4I:
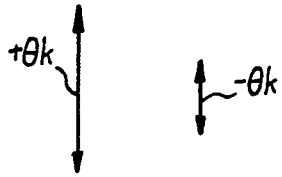

The light beam transmitted through the first quarterwave plate 14 is made incident upon the magneto-optic record medium 16 and is subjected to a Kerr rotation of $\pm\theta_K$ whose rotational direction is dependent upon the direction of the vertical magnetization in the magneto-optic record medium 16 as represented in FIG. 4D, in which R denotes the reflectance of the magneto-optic record medium. When the light beam is transmitted through the first quarterwave plate 14 again, the polarization direction of the light beam is rotated by 90 degrees, because the light beam includes the S-polarized component due to the Kerr rotation. Therefore, the light beams whose polarization direction have been rotated by $\pm\theta_K$ are converted into elliptically polarized beams which have the same intensity, but are rotated in the right-handed and left-handed directions, respectively as illustrated in FIG. 4E. When the thus elliptically polarized light beams are further reflected by the beam splitter 13 whose reflectances for the P-polarized and S-polarized light beams are $R_P$ and $R_S$, respectively, the shape of the ellipse is changed as shown in FIG. 4F. It should be noted that in FIG. 4F, only the P-polarized component is reduced, because $R_S$ is assumed to be equal to 100%. The light beam emanating from the beam splitter 13 is further transmitted through the second quarterwave plate 17 having the optical axis of the crystal set to 45 degrees with respect to the polarization plane of the incident light. Then, the light beam is converted into an elliptically polarized light beam, the direction of whose major axis is made identical with one of the P-polarized and S-polarized directions depending upon the rotational direction of the elliptically polarized light beam as shown in FIG. 4G. That is to say, when the elliptically polarized light beam transmitted through the second quarterwave plate 17 is rotated in the right-handed direction, the elliptically polarized light beam transmitted through the second quarterwave plate 17 has the major and minor axes aligned with the P- and S-polarized directions, respectively, and when the incident polarized light beam is rotated in the left-handed direction, the major and minor axes of the elliptically polarized light beam emanating from the second quarterwave plate 17 are aligned with the S- and P-polarization directions, respectively. Therefore, the light beams transmitted through and reflected by the polarization beam splitter 18 have opposite phases as illustrated in FIGS. 4H and 4I, respectively. These light beams transmitted through and reflected by the polarization beam splitter 18 are received by the photodetectors 19a and 19b, respectively, and the difference between the output signals of the photodetectors is derived by the differential amplifier 20 to obtain the reproduced information signal.

Next, the influence of the arrangement of the quarterwave plates 14 and 17 upon the reproduced signal will be explained.

Now it is assumed that the first quarterwave plate 14 is deviated by an angle $\alpha$ with respect to the desired orientation of 0 degree. Then, the Jones matrix of the quarterwave plate 14 may be represented as follows:

$$\frac{1}{\sqrt{2}} \begin{bmatrix} 1 + i\cos2\alpha & i\sin2\alpha \\ i\sin2\alpha & 1 - i\cos2\alpha \end{bmatrix}$$

When the light beam transmitted through the first quarterwave plate 14 is reflected and is subjected to the Kerr rotation by the record medium 16 and is transmitted again through the first quarterwave plate 14, the Jones vector may be expressed by the following equation.

$$\begin{bmatrix} i\cos\theta_K\cos2\alpha \\ i\cos\theta_K\sin2\alpha \pm \sin\theta_K \end{bmatrix}$$

Therefore, when the remaining optical elements are adjusted ideally, the amplitude of the reproduced signal obtained by deriving the difference between the output signals produced by the photodetectors 19a and 19b may be represented in the following manner:

$$RT_P\sqrt{R_P R_S}\ \sin2\theta_K\cos2\alpha \qquad (3)$$

When the equations (1) and (3) are compared with each other, it is apparent that the error component in the reproduced signal is reduced from cos 4$\alpha$ to cos 2$\alpha$. The differential unbalance amount between the average intensities of light beams impinging upon the two photodetectors 19a and 19b is not produced and the noise is not increased.

Next it is assumed that the second quarterwave plate 17 arranged between the beam splitter 13 and the polarizing beam splitter 18 is deviated from the given orientation of 45 degrees by $\alpha$. In this case, the intensity of light beams received by the photodetectors is decreased in proportion to cos 2$\alpha$ in the same manner as expressed by the equation (3):

$$RT_P\sin^2 2\alpha(R_P\cos^2\theta_K - R_S\sin^2\theta_K) \qquad (4)$$

As explained above, in the present embodiment, the influence of the deviation of the orientation of the two quarterwave plates 14 and 17 is reduced lower than a half of that of the known magneto-optic player shown in FIG. 1. Therefore, the optical system can be assembled adjusted easily and the cost of the player can be reduced.

Figure 5:
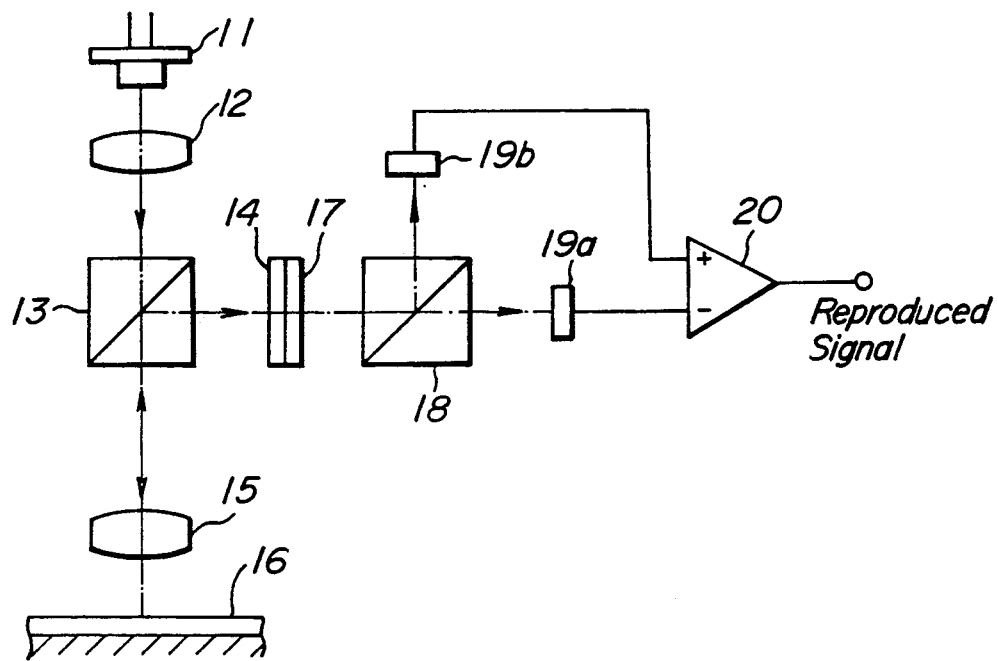
FIG. 5 is a schematic view depicting the construction of a second embodiment of the player according to the invention.

FIG. 5 is a schematic view showing the construction of a second embodiment of the magneto-optic player according to the invention. In this embodiment, the first quarterwave plate 14 is arranged between the beam splitter 13 and the polarizing beam splitter 18. The remaining construction of the present embodiment is entirely same as that of the first embodiment illustrated in FIG. 3. In the second embodiment, the influence of the deviation of the orientations of the quarterwave plates 14 and 17 is also reduced. That is to say, the light intensity is proportional to cos2$\alpha$, and the differential unbalance amount is expressed by the equation (4). Moreover, the two quarterwave plates 14 and 17 may be fixed to each other as depicted in FIG. 5. Then, the optical system can be made further compact and simple, and the adjustment of the optical system becomes further easy.

In the embodiments so far explained, the two quarterwave plates 14 and 17 are orientated at 0 and 45 degrees, respectively, with respect to the polarization plane of the incident linearly polarized light, but they may be arranged at 90 degrees and −45 degrees, respectively, with respect to the polarization plane of the incident linearly polarized light.

Figure 6:
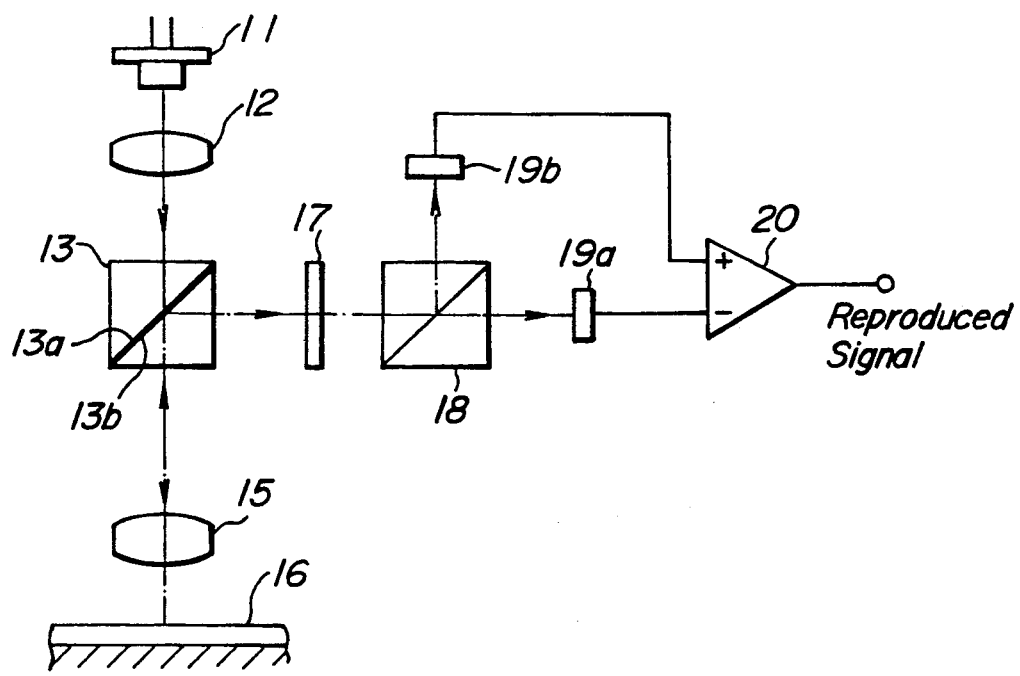
FIG. 6 is a schematic view denoting the construction of a third embodiment of the player according to the invention.

FIG. 6 is a schematic view showing the construction of a third embodiment of the magneto-optic player according to the invention. In the present embodiment, the first quarterwave plate is formed by an optical coating 13b applied on a reflection surface 13a of the beam splitter 13, said coating being capable of introducing the phase difference of 90 degrees between the P- and S-polarized components of the linearly polarized light reflected by the magneto-optic record medium 16.

The coating 13b may be formed by a stack of eleven layers alternately made of $TiO_2$ and $SiO_2$ having different refractive indices when the beam splitter 13 is made of glass BK7. By forming the coating 13b in this manner, it is possible to obtain the optical means having the following tables 1 to 4. For instance, when the light having the wavelength of 830 nm is made incident upon the coating 13b at the incident angle of 45.0000 degrees, it is possible to form the coating which introduces the phase difference of 91.28 degrees between the P- and S-polarized components and having reflectances of 17.17% and 96.08% for the P- and S-polarized components, respectively.

TABLE 1

| λ (nm) | Incident angle 44.8000 (deg) | | |
|---|---|---|---|
| | $R_P$ (%) | $R_S$ (%) | D (deg) |
| 820.0000 | 18.80 | 94.73 | −88.68 |
| 830.0000 | 17.82 | 95.77 | −90.43 |
| 840.0000 | 17.53 | 96.63 | −87.27 |

TABLE 2

| λ (nm) | Incident angle 45.2000 (deg) | | |
|---|---|---|---|
| | $R_P$ (%) | $R_S$ (%) | D (deg) |
| 820.0000 | 17.26 | 95.43 | −92.55 |
| 830.0000 | 16.56 | 96.38 | −91.89 |
| 840.0000 | 16.52 | 97.11 | −86.97 |

TABLE 3

| λ (nm) | Incident angle 45.0000 (deg) | | |
|---|---|---|---|
| | $R_P$ (%) | $R_S$ (%) | D (deg) |
| 820.0000 | 18.02 | 95.08 | −90.75 |
| 822.0000 | 17.80 | 95.29 | −91.30 |
| 824.0000 | 17.60 | 95.50 | −91.62 |
| 826.0000 | 17.43 | 95.70 | −91.72 |
| 828.0000 | 17.29 | 95.89 | −91.60 |
| 830.0000 | 17.17 | 96.08 | −91.28 |
| 832.0000 | 17.09 | 96.26 | −90.77 |
| 834.0000 | 17.03 | 96.43 | −90.09 |
| 836.0000 | 17.00 | 96.59 | −89.26 |
| 838.0000 | 16.99 | 96.74 | −88.29 |
| 840.0000 | 17.02 | 96.88 | −87.20 |

TABLE 4

| λ (nm) | Wavelength 830.0000 (nm) | | |
|---|---|---|---|
| | $R_P$ (%) | $R_S$ (%) | D (deg) |
| 44.5000 | 18.84 | 95.27 | −88.69 |
| 44.6000 | 18.50 | 95.44 | −89.33 |
| 44.7000 | 18.15 | 95.60 | −89.91 |
| 44.8000 | 17.82 | 95.77 | −90.43 |
| 44.9000 | 17.49 | 95.93 | −90.88 |
| 45.000 | 17.17 | 96.08 | −91.28 |
| 45.1000 | 16.86 | 96.23 | −91.61 |
| 45.2000 | 16.56 | 96.38 | −91.89 |
| 45.3000 | 16.26 | 96.52 | −92.11 |
| 45.4000 | 15.96 | 96.66 | −92.28 |

Now the operation of the third embodiment of the magneto-optic player according to the invention will be explained with reference to the polarized conditions and Jones vectors shown in FIGS. 7A to 7G.

The linearly polarized light illustrated in FIG. 7A and emitted from the semiconductor laser 11 is made incident upon the beam splitter 13 as the P-polarized light. Since this incident light has no S-polarized component, the incident light is transmitted through the coating 13b arranged in the beam splitter 13 as shown in FIG. 7B, although the coating 13b has the function to introduce the phase difference of 90 degrees between the P- and S-polarized components. The amplitude of the light transmitted through the beam splitter 13 becomes $\sqrt{T_P}$.

Figure 2A:
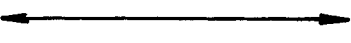
FIGS. 2A to 2G are vectors for explaining the operation of the known player shown in FIG. 1.
Figure 2B:
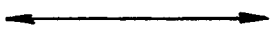
Figure 2C:
Figure 2D:
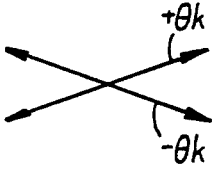
Figure 2E:
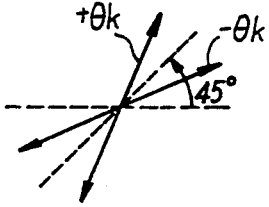
Figure 2F:
Figure 2G:

Then, the linearly polarized light is made incident upon the magneto-optic record medium 16 and is subjected to the Kerr rotation of $\pm\theta_K$ depending on the direction of vertical magnetization in the record medium as illustrated in FIG. 7C. The linearly polarized light reflected by the magneto-optic record medium 16 is made incident upon the beam splitter 13 and is reflected by the coating 13b in the beam splitter 13. Since this light contains the S-polarized component, the phase is shifted by 90 degrees and is converted into an elliptically polarized light which is rotated in the right-handed or left-handed direction depending on the direction of the Kerr rotation as depicted in FIG. 7D. The dimension of the ellipses are identical with each other. The elliptically polarized light is then made incident upon the second quarterwave plate 17 and is converted into an elliptically polarized light whose major and minor axes are aligned with the P- and S-polarized directions, respectively, when the elliptic polarization impinging upon the second quarterwave plate 17 is rotated in the right-handed direction as shown in FIG. 7E. On the other hand, when the elliptically polarized light impinging upon the quarterwave plate 17 is rotated in the left-handed direction, the major and minor axes of the ellipse are aligned with the S- and P-polarized directions, respectively. Then, the elliptically polarized light is made incident upon the polarizing beam splitter 18, and the light beams reflected by and transmitted through the polarizing beam splitter have the opposite phases as shown in FIGS. 2F and 2G, and are received by the photodetectors 19a and 19b, respectively.

In the third embodiment just explained above, the influence of the deviation in the orientation of the second quarterwave plate 17 is proportional to cos 2α, and the differential unbalance amount is expressed by the equation (4), so that the same operation function as that of the first embodiment can be attained.

In the above explained third embodiment, the coating 13b for introducing the phase difference of about 90 degrees is arranged on the reflecting surface 13a of the beam splitter 13, it may be arranged on a reflecting surface arranged between the magneto-optic record medium 16 and the second quarterwave plate 17. In the manner explained above, in the magneto-optic player according to the invention, the decrease in C/N of the reproduced signal due to the error in the adjustment of the optical system can be reduced to a large extent, and therefore the optical system can be assembled easily and the cost for adjusting the optical system can be also reduced.

What is claimed is:

1. A magneto-optic player for reproducing an information signal stored in a magneto-optic record medium in a vertical magnetization format, comprising:

a light source means for emitting a linearly polarized light beam;

a first optical means, positioned along a travelling direction of said linearly polarized light beam from said light source means, for (i) allowing said linearly polarized light beam to impinge upon the magneto-optic record medium as a linearly polarized light beam and (ii) converting a linearly polarized light beam reflected by the magneto-optic record medium into a first elliptically polarized light having a polarization in one of a right-handed rotational direction and a left-handed rotational direction depending upon a direction of vertical magnetization in the magneto-optic record medium;

a second optical means for receiving and converting said elliptically polarized light beam emanating from the first optical means into a second elliptically polarized light beam which has a major axis oriented in one of a first direction and a second direction orthogonal to said first direction depending upon whether the first elliptically polarized light beam is polarized in the right-handed rotational direction or the left-handed rotational direction;

a third optical means for receiving said second light beam and transmitting a first polarized component which is polarized in a direction substantially perpendicular said first direction and reflecting a second polarized component which is polarized in a direction substantially perpendicular to said second direction; and a detecting means for reproducing the information signal by detecting the first polarized component and the second polarized component transmitted through and reflected respectively by the third optical means in a differential manner.

2. A player according to claim 1, wherein said first optical means comprises a first quarterwave plate made of a crystal and being arranged such that an optical axis of said crystal is indicated by one of zero and 90 degrees with respect to a polarization plane of incident linearly polarized light.

3. A player according to claim 2, wherein said second optical means comprises a second quarterwave plate made of a crystal and being arranged such that an optical axis of said crystal is inclined by ±45 degrees with respect to a polarization plane of incident linearly polarized light.

4. A player according to claim 3, wherein said light source means comprises a laster light source for emitting laser light, a beam splitter arranged to transmit the laser light emitted by the laser light source, and an objective lens for projecting laser light transmitted through said beam splitter onto the magneto-optical record medium and conveying light reflected from the magneto-optic record medium to the beam splitter, said beam splitter directing the light reflected by the magneto-optic record medium toward the second quarterwave plate.

5. A player according to claim 4, wherein said first quarterwave plate is arranged between the beam splitter and the objective lens.

6. A player according to claim 4, wherein said first quarterwave plate is arranged between the beam splitter and the second quarterwave plate.

7. A player according to claim 6, wherein said first and second quarterwave plates are fixed to each other.

8. A player according to claim 1, wherein said first optical means comprises a reflecting surface arranged in an optical path of light reflected by the magneto-optic record medium and an optical coating applied on said reflecting surface, said coating comprising means for generating a phase difference of substantially 90 degrees between P-polarized light and S-polarized light.

9. A player according to claim 8, wherein said light source means comprises a laser light source for emitting laser light, a beam splitter arranged to transmit the laser light emitted by the laser light source, and an objective lens for projecting laser light transmitted through said beam splitter and conveying light reflected from the magneto-optic record medium to the beam splitter, said beam splitter directing light conveyed thereto by said objective lens toward the second optical means, and said reflecting surface of the first optical means on which said coating is applied is formed by a reflecting surface of the beam splitter.

10. A player according to claim 8, wherein said coating is formed by a stack of a plurality of optical layers having alternately different refractive indices.

11. A player according to claim 1, wherein said third optical means comprises a polarization beam splitter.

* * * * *